United States Patent
Dariush et al.

(10) Patent No.: US 7,217,247 B2
(45) Date of Patent: May 15, 2007

(54) GRAVITY COMPENSATION METHOD IN A HUMAN ASSIST SYSTEM AND A HUMAN ASSIST SYSTEM WITH GRAVITY COMPENSATION CONTROL

(75) Inventors: Behzad Dariush, Sunnyvale, CA (US); Yasushi Ikeuchi, Saitama (JP); Masakazu Kawai, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 590 days.

(21) Appl. No.: 10/655,460

(22) Filed: Sep. 5, 2003

(65) Prior Publication Data

US 2005/0102111 A1 May 12, 2005

Related U.S. Application Data

(60) Provisional application No. 60/484,708, filed on Jul. 3, 2003, provisional application No. 60/421,964, filed on Oct. 28, 2002, provisional application No. 60/413,024, filed on Sep. 23, 2002.

(51) Int. Cl.
*A61B 5/103* (2006.01)
*G06F 19/00* (2006.01)
*G01L 5/00* (2006.01)

(52) U.S. Cl. .............................. 601/5; 600/595; 601/35
(58) Field of Classification Search ..................... None
See application file for complete search history.

(56) References Cited

U.S. PATENT DOCUMENTS 4,244,120 A 1/1981 Harris (Continued)

FOREIGN PATENT DOCUMENTS

JP 2000-249570 9/2000
RU 2 107 328 C1 3/1998
WO WO 00/35346 6/2000
WO WO 03/002054 A1 1/2003

OTHER PUBLICATIONS

Agarwal, S.K. et al., "Theory and Design of an Orthotic Device for Full or Partial Gravity-Balancing of a Human Leg During Motion," IEEE Transactions on Neural Systems and Rehabilitation Engineering, Jun. 2004, vol. 12, No. 2.

(Continued)

*Primary Examiner*—Danton DeMille
(74) *Attorney, Agent, or Firm*—Fenwick & West LLP

(57) ABSTRACT

A method for obtaining an assist torque to be applied to a human joint, in a human assist system for applying an assist torque to the human joint to reduce load of muscles, and the human assist system are provided. The method comprises the step of obtaining a moment due to gravity, acting on a joint of each human segment, based on equations of force and moment balance on each segment. The method further comprises the step of obtaining an assist torque to be applied to the joint to compensate for the moment due to gravity, acting on the joint. The human assist system comprises a motor for delivering an assist torque to a joint and a motor driver for driving control of the motor. The system further comprises a controller for determining a desired value of an assist torque, comprising a processor and a memory. The controller is configured to obtain a moment due to gravity, acting on a joint of each human segment, based on equations of force and moment balance on each segment and then to obtain an assist torque to be delivered to the joint to compensate for the moment due to gravitational acceleration at the joint.

The method provides a natural subdivision between the voluntary actuators which are responsible for forward progression of motion and the assist actuators which are responsible for preserving static equilibrium. This subdivision may mitigate the interference between voluntary control and artificial control.

23 Claims, 15 Drawing Sheets

U.S. PATENT DOCUMENTS

| | | | |
|---|---|---|---|
| 4,786,847 | A | 11/1988 | Daggett et al. |
| 4,834,200 | A | 5/1989 | Kajita |
| 5,044,360 | A | 9/1991 | Janke |
| 5,136,227 | A | 8/1992 | Nakano et al. |
| 5,247,432 | A | 9/1993 | Ueda |
| 5,323,549 | A | 6/1994 | Segel et al. |
| 5,362,288 | A | 11/1994 | Razon |
| 5,432,417 | A | 7/1995 | Takenaka et al. |
| 5,459,659 | A | 10/1995 | Takenaka |
| 5,570,286 | A | 10/1996 | Margolis et al. |
| 5,625,577 | A | 4/1997 | Kunii et al. |
| 5,659,480 | A | 8/1997 | Anderson et al. |
| 5,706,589 | A | 1/1998 | Marc |
| 5,808,433 | A | 9/1998 | Tagami et al. |
| 5,835,693 | A | 11/1998 | Lynch et al. |
| 5,942,869 | A | 8/1999 | Katou et al. |
| 5,982,389 | A | 11/1999 | Guenter et al. |
| 6,045,524 | A | 4/2000 | Hayashi et al. |
| 6,076,025 | A | 6/2000 | Ueno |
| 6,152,890 | A | 11/2000 | Kupfer et al. |
| 6,161,080 | A | 12/2000 | Aouni-Ateshian et al. |
| 6,289,265 | B1 | 9/2001 | Takenaka et al. |
| 6,445,983 | B1 | 9/2002 | Dickson et al. |
| 6,505,096 | B2 | 1/2003 | Takenaka et al. |
| 6,580,969 | B1 * | 6/2003 | Ishida et al. ................ 700/245 |
| 6,633,783 | B1 | 10/2003 | Dariush et al. |
| 6,640,160 | B2 | 10/2003 | Takahashi et al. |
| 6,750,866 | B1 | 6/2004 | Anderson, III |
| 6,766,204 | B2 | 7/2004 | Niemeyer et al. |
| 6,785,591 | B1 | 8/2004 | Hansson |
| 6,943,520 | B2 | 9/2005 | Furuta et al. |
| 7,013,201 | B2 | 3/2006 | Hattori et al. |
| 7,112,938 | B2 | 9/2006 | Takenaka et al. |
| 7,135,003 | B2 | 11/2006 | Dariush |
| 2003/0018283 | A1 | 1/2003 | Dariush |
| 2003/0023415 | A1 | 1/2003 | Nakamura et al. |
| 2004/0102723 | A1 | 5/2004 | Horst |
| 2004/0107780 | A1 | 6/2004 | Kawai et al. |
| 2004/0158175 | A1 | 8/2004 | Ikeuchi et al. |
| 2004/0193318 | A1 | 9/2004 | Ito |
| 2004/0249319 | A1 | 12/2004 | Dariush |
| 2004/0254771 | A1 | 12/2004 | Riener et al. |
| 2005/0102111 | A1 | 5/2005 | Dariush et al. |
| 2005/0104548 | A1 | 5/2005 | Takenaka et al. |
| 2005/0209535 | A1 | 9/2005 | Dariush |
| 2006/0046909 | A1 | 3/2006 | Rastegar et al. |
| 2006/0100818 | A1 | 5/2006 | Nakamura et al. |
| 2006/0139355 | A1 | 6/2006 | Tak et al. |

OTHER PUBLICATIONS

Akhlaghi, F. et al., "In-shoe Biaxial Shear Force Measurement: the Kent Shear System," Medical & Biological Engineering & Computing, Jul. 1996, vol. 34, pp. 315-317.

Anderson, Frank C., "Static and Dynamic Optimization Solutions for Gait are Practically Equivalent", Journal of Biomechanics, 2001, vol. 34, pp. 153-161.

Anderson, F. et al., "Dynamic Optimization of Human Walking," *Journal of Biomechanical Engineering*, Oct. 2001, vol. 123, pp. 381-390.

Anderssen, R. et al., "Numerical Differentiation Procedures for Non-Exact Data," Numererische Mathematik, 1974, vol. 22, pp. 157-182.

Atkeson, C.G., "Learning Arm Kinematics and Dynamics", Annual Reviews, Inc., 1989, vol. 12, pp. 157-183.

Baruh, H., Analytical *Dynamics*, Chapter 7, Rigid Body Kinematics, McGraw-Hill, 1999, pp. 355-371.

Blaya, J., "Force-Controllable Ankle Foot Orthosis (AFO) to Assist Drop Foot Gait," Feb. 2003, web.mit.edu/jblaya/www/MSthesis_final.pdf.

Bronzino, J.D., ed., "The Biomedical Engineering Handbook", IEEE Press, 2nd Ed. vol. 2, 2000, Chapter 142, pp. 1-17.

Burdea, G. et al., "Virtual Reality Technology", 1994, pp. 33-37, John Wiley and Sons, Inc.

Busby, H.R. et al., "Numerical Experiments With a New Differentiation Filter," Transactions of the ASME—Journal of Biomechanical Engineering, Nov. 1985, vol. 107, pp. 293-299.

Chao, E.Y. et al., "Application of Optimization Principles in Determining the Applied Moments in Human Leg Joints During Gait," J. Biomechanics, 1973, vol. 6, pp. 497-510, Pergamon Press, Great Britain.

Craig, J.J., "Nonlinear Control of Manipulators," Introduction to Robotics Mechanics and Control, 2nd. Ed., 1989, Chapter 10, pp. 333-361.

Crowninshield, R.D. et al., "A Physiologically Based Criterion Of Muscle Force Prediction In Locomotion," *Journal of Biomechanics*, vol. 14, No. 11, 1981, pp. 793-801.

Cullum, J., "Numerical Differentiation and Regularization," SIAM J. Numer. Anal., Jun. 1971, vol. 8, No. 2, pp. 254-265.

Dariush, B. et al., "Multi-Modal Analysis of Human Motion From External Measurements," Transactions of the ASME, Jun. 2001, vol. 123, pp. 272-278.

Dariush, B, "A Novel Algorithm For Generating A Forward Dynamics Solution To The Traditional Inverse Dynamics Problem," In *4th World Congress of Biomechanics*, Calgary, Canada, 2002.

Dariush, B., "A Forward Dynamics Solutions To Multi-Modal Inverse Dynamics Problems," In *International Society of Biomechanics, XIXth Congress*, Dunedin, NZ, 2003.

Dariush, B., "A Well-Posed, Embedded Constraint Representation of Joint Moments From Kinesiological Measurements," Journal of Biomechanical Engineering, Aug. 2000, vol. 122, pp. 437-445.

Delp, S. et al., "A Computational Framework for Simulating and Analyzing Human and Animal Movement," *IEEE Computing in Science and Engineering*; vol. 2, No. 5, 2000, pp. 46-55.

Dohrmann, C.R. et al., "Smothing Noisy Data Using Dynamic Programming and Generalized Cross-Validation" Transactions of the ASME—Journal of Biomechanical Engineering, Feb. 1988, vol. 110, pp. 37-41.

Flanagan, R.J., et al., "The Role of Internal Models in Motion Planning and Control: Evidence from Grip Force Adjustments During Movements of Hand-Held Loads", The Journal of Neuroscience, Feb. 15, 1997, vol. 17(4), pp. 1519-1528.

Giakas, G. et al., "A Comparison of Automatic Filtering Techniques Applied to Biomechanical Walking Data," J. Biomechanics 1997, vol. 00, No. 00, 4 pages.

Giakas, G. et al., "Optimal Digital Filtering Requires a Different Cut-Off Frequency Strategy for the Determination of the Highe Derivatives," J. Biomechanics, Apr. 1997, vol. 28, No. 00, 5 pages.

Grood, E.S. et al., "A Joint Coordinate System for the Clinical Description of Three Dimensional Motions: Application to the Knee," Journal of the Biomechanical Engineering, 1983, pp. 136-144, No. 105.

Gruber, K., et al., "A Comparative Study of Impact Dynamics: Wobbling Mass Model Versus Rigid body Models", Journal of Biomechanics, 31 (1998), pp. 439-444.

Hatze, H. "The Use of Optimally Regularized Fourier Series for Estimating Higher-Order Derivatives of Noisy Biomechanical Data," J. Biomechanics, 1981, vol. 14, pp. 13-18.

Hayashibara, Y. et al., "Design of a Power Assist System with Consideration of Actuator's Maximum Torques," 4th IEEE International Workshop on Robot and Human Communication, RO-MAN'95, Tokyo, Jul. 5-7, 1995, pp. 379-384, [online] Retrieved from the Internet<URL:http://ieeexplore.ieee.org/xpl/abs_free.jsp?arNumber=531990>.

Hemami, H., "A Feedback On-Off Model of Biped Dynamics", IEEE Transactions on Systems, Man, and Cybernetics, Jul. 1980, vol, SMC-10, No. 7, pp. 376-383.

Hemami, H. et al., "Modeling And Control Of constrained Dynamic Systems With Application To Biped Locomotion In The Frontal Plane," *IEEE Transactions on Automatic Control*, vol. 4, No. 4, Aug. 1979, pp. 526-535.

Hemami, H., "A State Space Model for Interconnected Rigid Bodies," IEEE Trans. on Automatic Control, 1982, pp. 376-382, vol. 27, No. 2.

Hosein, R. et al., "A Study of In-shoe Plantar Shear in Normals," Clinical Biomechanics, 2000, vol. 15, pp. 46-53.

Hungspreugs, P. et al., "Muscle Force Distribution Estimation Using Static Optimization Techniques", Technical Report—Honda R&D Americas.

Jalics, L. et al., "A Control Strategy for Terrain Adaptive Bipedal Locomotion," Autonomous Robots, 1997, pp. 243-257, vol. 4.

Jezernk, S. et al., "Robotic Orthosis Lokomat: A Rehabilitation and Research Tool," Neuromodulation, 2003, pp. 108-115, vol. 6, No. 2.

Kawato, M., "Adapation and Learning in Control of Voluntary Movement by the Central Nervous System", 1989, Advanced Robotics, vol. 3, pp. 229-249.

Kawato, M., et al., "The Cerebellum and VOR/OKR Learning Models", Elsevier Science Publishers Ltd., 1992, vol. 15, No. 11, pp. 445-453.

Kawato, M., "Internal Models for Motor Control and Trajectory Planning," Current Opinion in Neurobiology, 1999, pp. 718-727, No. 9.

Khatib, O., A Unified Approach For Motion And Force Control Of Robot Manipulators: The Operational Space Formulation, *IEEE Journal of Robotics and Automation*, RA-3(1), 1987, pp. 43-53.

Klein, C. A. et al., Review Of Pseudoinverse Control For Use With Kinematically Redundant Manipulators, *IEEE Transactions on Systems, Man, and Cybernetics*, vol. 13, No. 2, 1983, pp. 245-250.

Park, J.H. et al., Biped Robot Walking Using Gravity-Compensated Inverted Pendulum Mode and Computed Torque Control, 1998 IEEE Conference on Robotics and Automation, May 16-20, 1998, pp. 2528-2533, vol. 4, [online] Retrieved from the Internet<URL:http://ieexplore.ieee.org/xpl/abs_free.jsp?arNumber=680985>.

Piazza, S. et al., "Three-Dimensional Dynamic Simulation of Total Knee Replacement Motion During a Step-up Task," *Journal of Biomechanical Engineering*, vol. 123, 2001, pp. 599-606.

Rahman, T. et al., "A Simple Technique to Passively Gravity-Balance Articulated Mechanisms," Journal of Mechanical Design, 1995, pp. 655-658, vol. 117, No. 4.

Runge, C.F. et al., "Estimating Net Joint Torques From Kinesiological Data Using Optimal Linear System Theory." IEEE Transactions on Biomedical Engineering, Dec. 1995, vol. 42, No. 12, pp. 1158-1164.

Shadmehr, R. et al., "Interference in Learning Internal Models of Inverse Dynamics in Humans," Advances in Neural Information Processing Systems, 1995, pp. 1117-1224, Chapter 7.

Shadmehr, R., "Learning Virtual Equilibrium Trajectories for Control of a Robot Arm", Neural Computation, 1990, vol. 2, pp. 436-446.

Simons, W. et al., "Differentiation of Human Motion Data Using Combined Spline and Least Squares Concepts," Journal of Biomechanical Engineering, Transactions of the ASME, Aug. 1991, vol. 113, pp. 348-351.

Thelen, D. et al., "Generating Dynamic Simulations of Movement Using Computed Muscle Control," *Journal of Biomechanics*, 36, 2003, pp. 321-328.

Transmittal of the International Search Report, PCT/US02/20829, Dec. 12, 2002, 4 pages.

"Unsupported Standing with Minimized Ankle Muscle Fatigue," [online] Retrieved from the Internet<URL:http://ieeexplore.ieee.org/iel5/10/29163/01315854.pdf>.

Vaughan, C. L. et al., "Appendix B., Detailed Mathematics Used in GaitLab," *Dynamics of Human Gait*, Second Edition, Kiboho Publishers, Cape Town South Africa, 1999, pp. 83-106.

Vukobratovic, M. et al., *Scientific Fundamentals of Robotics 7: Biped Loco-motion*. Springer-Verlag, 1990, pp. 17-27.

Winter, D.A., "Kinetics: Forces and Moments of Force," Biomechanics and Motor Control of Human Movement, 2nd Ed., New York, 1990, Chapter 4.

Wittenberg, J., *Dynamics of Systems of Rigid Bodies*, 1977, B.G. Teubner Stuttgart, 1997, pp. 29-30.

Wolpert, D.M., et al., "Ocular Limit Cycles Induced by Delayed Retinal Feedback", Experimental Brain Research, 1993, vol. 96, pp. 173-180.

Woltring, H.J., "A Fortran Package for Generalized, Cross Validatory Spline Smoothing and Differentiation," Adv. Eng. Software, 1986, vol. 8, No. 2, pp. 104-107.

Woltring, H.J., "On Optimal Smoothing and Derivative Estimation From Noisy Displacement Data in Biomechanics," Human Movement Science, vol. 4, 1985, pp. 229-245.

Written Opinion, PCT/IB02/04311, Feb. 20, 2003, 2 pages.

Zajac, F.E., "Muscle and Tendon Properties, Models, Scaling, and Application to Biomechancis and Motor Control", 1989, vol. 17, Issue 4, pp. 359-411.

Kato, H. and Hirata, T., "The Concept of a Walking Assistance Suit", The Japanese Society of Mechanical Engineers, Aug. 2001.

R. Wells, M. Morrisey, and R. Hughson, "Internal and Physiological Responses During Concentric and Eccentric Cycle Ergometry", Eur. J. Appl. Physiol, 55: 291-301, 1986.

Gagnon, M. and Smith, G., "Muscular Mechanical Energy Expenditure as a Process for Detecting Potential Risks in Manual Materials Handling", J. Biomechanics, vol. 24, No. 3/4; pp. 191-203, Nov. 1991.

Winter, D.A., "Biomechanics and Motor Control of Human Movement", 2nd Edition, John Wiley & Sons, Inc., pp. 51-74.

Gagnon D., and Gagnon, M., "The Influence of Dynamic Factors on Triaxial Net Muscular Moments at the L5/S1 Joint During Asymmetrical Lifting and Lowering", Journal of Biomechanics, vol. 25, pp. 891-901, 1992.

Hsiang, S.H., and McGorry, R.W., "Three Different Lifting Strategies for Controlling the Motion Patterns of the External Load", Ergonomics, vol. 40, pp. 928-939, 1997.

"Berkeley Researchers Developing Robotic Exoskeleton That Can Enhance Human Strength and Endurance,"ScienceDaily LLC, 1995-2004, [online] [Retrieved on Oct. 9, 2006] Retrieved from the Internet<URL:http://bleex.me.berkeley.edu/bleexhistPDFs/sciencedaily.pdf>.

Durfee, W.K., "Preliminary Design and Simulation of a Pneumatic, Stored-Energy, Hybrid Orthosis for Gait Restoration," Proceedings of IMECE04, 2004 ASME International Mechanical Engineering Congress, Nov. 13-20, 2004, [online] [Retrieved on Oct. 9, 2004] Retrieved from the Internet<URL:http://www.me.umn.edu/~wkdurfee/publications/IMECE2004-60075.pdf>.

International Search Report and Written Opinion, PCT/US06/11727, Nov. 9, 2006, 9 pages.

Isaacs, P.M. et al., "Controlling Dynamic Simulation with Kinematic Constraints, Behavior Functions, and Inverse Dynamics," Computer Graphics, Jul. 1987, pp. 215-224, vol. 21, No. 4.

Madigan, R.R., "Ankle-Foot Orthoses (AFO's) in Spastic Cerebral Palsy," Fillauer LLC, [online] [Retrieved on Oct. 9, 2006] Retrieved from the Internet<URL:http://www.fillauer.com/education/ED_afo.html#dynamic>.

Pratt, G. A. et al., "Active orthotics for Halping the Neuromuscularty Imparied to Walk," [online] [Retrieved on Oct. 9, 2006] Retrieved from the Internet<URL:http://www.vcl.uh.edu/~rcv03/materials/grant/9733740.1064791086.pdf>.

"Regenerative Foot Braking," [online] [Retrieved on Oct. 9, 2006] Retrieved from the Internet<URL:http://www.halfbakery.com/idea/regenerative_20foot_20braking#1069693200>.

"Sensorless Fet Element DC Motor Driver," [online] [Retrieved on Oct. 9, 2006] Retrieved from the Internet<URL:http://robotx.sourceforge.net/bridge/bridge.shtml>.

Trost, F.J., "Energy-Storing Feet," JACPOC, 1989, vol. 24, No. 4, [online] [Retrieved on Oct. 9, 2006] Retrieved from the Internet<URL:http://jacpoc.oandp.com/library/1989_04_082.asp>.

International Search Report and Written Opinion, PCT/US06/22582, Feb. 2, 2007, 8 pages.

Wyeth, G.F. et al., "Distributed Digital Control of a Robot Arm," Proceedings of the Australian Conference on Robotics and Automation (ACRA 2000), pp. 217-222, Aug. 30-Sep. 1, 2000, [online] [Retrieved on Dec. 31, 2006] Retrieved from the Internet<URL:www.itee.uq.edu.au/~wyeth/Publications/puma.PDF>.

* cited by examiner

GRAVITY COMPENSATION METHOD IN A HUMAN ASSIST SYSTEM AND A HUMAN ASSIST SYSTEM WITH GRAVITY COMPENSATION CONTROL

CROSS-REFERENCE TO RELATED APPLICATIONS

This application claims priority of U.S. provisional applications No. 60/413,024 filed on Sep. 23, 2002 and No. 60/421,964 filed on Oct. 28, 2002 and No. 60/484,708 filed on Jul. 3, 2003.

FIELD OF THE INVENTION

The present invention relates to a method for obtaining assist torques to be applied to joints of legs through gravity compensation control in a human assist system. The present invention further relates to a human assist system with gravity compensation control.

BACKGROUND OF THE INVENTION

At Honda's Wako Research Center, a mechanically powered walking assist prototype system was recently unveiled (Katoh and Hirata, The Concept of a Walking Assistance Suit, Welfare Engineering Symposium, The Japan Society of Mechanical Engineers, August 2001). The target application is to help the elderly and disabled people to either execute daily tasks they could not previously perform, or use less physical exertion than they currently employ for these tasks. The tasks considered include walking, lifting, sitting/standing, and climbing stairs. A big challenge in developing control algorithms for exoskelton systems is the control problem. The complexity of the central nervous system (CNS) control and the interface between voluntary control and external artificial control are challenging, unanswered questions.

Thus, there is a great need for a human assist system and a method which will mitigate the interface between voluntary control and external artificial control.

SUMMARY OF THE INVENTION

Human exoskeletons are structures of rigid links mounted on the body that promise to enable normal humans to perform their daily activities with less effort. A major limitation of the practical use of exoskeletons for daily activities relate to the control problem. The complexity of the central nervous system (CNS) control and the interface between voluntary control and external artificial control are challenging, unanswered questions. In this specification, we present a novel method for partitioning the mechanism between voluntary control and artificial control by the concept of relegation of control. In particular, the control of humans equipped with an augmentation device (human assist system) is relegated to two subsystems: motion generation and gravity compensation. The motion generation subsystem represents execution of voluntary motion from commands generated from the central nervous system. This subsystem describes the kinetic energy of the motion. The gravity compensation subsystem is responsible for artificial control of the actuators attached to the body. The gravity compensation control accounts for the potential energy of the system and is responsible for compensating for the torques due to gravitational acceleration. This partitioning of the control to the corresponding kinetic and potential energy is hypothesized to mitigate the amount of interference between voluntary control and artificial control.

Gravity Compensation Concept

Skeletal muscles which produce the muscle torque are also called "voluntary muscles" because they are responsible for purposeful movement of the body. These muscles are voluntary as the person can control their motion with his/her will. A challenging problem in the design of exoskeleton controls is to develop controllers which minimize the interference between the assist control and the voluntary motion executed by the neuromuscular system. In order to design an effective controller, consider the mathematical representation of the dynamics of a musculoskeletal system actuated by voluntary control from the muscles and artificial control from the augmentation device. The dynamics can be modeled by the following set of differential equations, $$M(q)\ddot{q}+H(q,\dot{q})\dot{q}+G(q)=\tau_m+\tau_a \quad (1)$$

where $\tau_m$ and $\tau_a$ are the torques developed from the voluntary control of muscle actuators and artificial control of assist actuators, respectively. The vector q represents the generalized coordinates, M is the inertia matrix, H describes the effects of the coriolis and centrifugal torques, and G is the vector of gravitational forces. Equation 1 describes the dynamics of an unconstrained system. If the motion of the human involves external contact, or closed loops (such as both feet on the ground), the dynamics must be modified, $$M(q)\ddot{q}+H(q,\dot{q})\dot{q}+G(q)=\tau_m+\tau_a+J^T\Gamma \quad (2)$$

where, $J^T$ is the Jacobian transpose matrix, and $\Gamma$ represents the contact force.

The sum of the voluntary muscle torque $\tau_m$ and exoskeleton assist torque $\tau_a$ represents the net joint torque, $\tau_n$, acting at the joint $$\tau_n=\tau_m+\tau_a \quad (3)$$

The computation of the actuator controls from the system of equations in 1 is inherently ill-posed, i.e. different combinations of muscle torques and assist torques can produce the same motion (or same net joint torque). One method to resolve the redundancy is by a concept called relegation of control. A relegated control strategy can be used to assign (or relegate) the motion generation component of the dynamics to voluntary motion, actuated by the muscles, and to assign the static equilibrium component to the exoskeleton actuators.

This subdivision is equivalent to partitioning the equations of motion into the kinetic energy component and the potential energy component, respectively. Since the rate of change of the potential energy of the system is simply the torque due to gravity, the exoskeleton actuators must generate a torque $\tau_g$ to compensate for forces due to gravitational acceleration. The mathematical representation of this partitioning for the unconstrained system is given by, $$\tau_a=\tau_g=G(q) \quad (4)$$

$$\tau_m=M(q)\ddot{q}+H(q,\dot{q})\dot{q} \quad (5)$$

Therefore, the control law for the assist torque $\tau_a$ is simply a controller which negates the effects due to gravity. Hence, we refer to the control law of equation 4 as gravity compensation controller.

The gravity compensation control has several compelling features as noted below.

1) There is a natural subdivision between the voluntary actuators which are responsible for forward progression of motion and the assist actuators which are responsible for preserving static equilibrium. This subdivision may mitigate the interference between voluntary control and artificial control.

2) Since gravity torques are a function of joint positions and orientations and do not contain velocity and acceleration terms, a gravity compensation strategy is not sensitive to noise amplification from numerical differentiation of kinematic variables.

3) Although gravity compensation can be viewed as a model based control strategy, it has limited sensitivity to parametric uncertainties as compared to inverse dynamics methods which require very precise dynamic models.

One limitation of a pure gravity compensation control algorithm is that it may degrade efficiency for certain tasks whereby gravity effects actually help the forward progression of motion. For example, human gait is believed to be a highly efficient motion due to the passive transfer of potential to kinetic energy from the gravitational forces. A method is required to determine when gravity compensation will help motion and when it will interface with the natural dynamics of the system. Subsequently, a more intelligent control can be developed to account for the deficiency of gravity compensation for certain tasks and at a particular point.

In the following section, we provide the basis for instances when gravity compensation is mechanically efficient, i.e. preserves the natural dynamics of the overall system.

The Basis for an Intelligent Assist Control

The coordinated and intelligent action of the assist torque not only provides opportunity to reduce fatigue, but also enables control of joint impedance to stabilize motion. Although it is difficult to quantify the degree to which an assist torque can stabilize motion, the effects of additional actuation on the energetics of motion may be more readily incorporated in the design of an assist control. The mechanical energies are excellent means of quantifying and describing the efficiencies associated with an assist control algorithm. At the joint level, the biomechanical quantities used to describe the power generated by the muscles is the product of net voluntary muscular moment, $\tau_m$ and joint angular velocity, $\Omega$.

$$P_m = \tau_m \Omega \tag{6}$$

Similarly the net joint power is given by $$P_n = \tau_n \Omega \tag{7}$$

Evaluation of power output at the joint level overlooks the presence of co-activation which has been experimentally confirmed in stabilizing the musculoskeletal system by enhancing the joint impedance. In other words, the power equations described in Equation 6 and 7 cannot account for simultaneous generation of power by one muscle group and absorption by the antagonist group, or vice versa.

However, if the power contribution of individual muscles is considered, a more precise consideration of energy flow in the system can be obtained which may point to more appropriate algorithms for assist control. If the muscle force and the rate of change of muscle length are known, the power contribution of an individual muscle (Pm) can be determined from $$P_m = F_m \dot{L} \tag{8}$$

where $F_m$ and $\dot{L}$ represent muscle force and muscle velocity, respectively. It should be noted that the muscle power at the joint level, using Equation 6, is not equivalent to the sum of the power contribution of muscles that span it. Power is the rate of doing work. In order to calculate work done, we must integrate power over a period of time. The work done by the voluntary muscular action during a period $t_1$ to $t_2$ is $$W_m = \int_{t_1}^{t_f} P_m \, dt \tag{9}$$

Similarly, the net mechanical work from the muscles and the assist actuators is given by, $$W_n = \int_{t_1}^{t_f} P_n \, dt \tag{10}$$

The power Pm and work Wm can be either positive or negative. Positive work is work done during a concentric contraction, when the muscle moment acts in the same direction as the angular velocity of the joint. Concentric contractions occur when the muscle contraction permits the muscle to shorten. Negative work is work done during an eccentric contraction, when the muscle moment acts in the opposite direction to the movement of the joint. Eccentric action occurs when a muscle is activated, but is forced to lengthen due to the high external load. A larger muscle tension can be created by the same activation level during eccentric action at the muscle length and velocity than during the concentric action. Also, it has been shown that eccentric contraction is metabolically more efficient. References should be made to the following documents.

R Wells, M Morrisey, and R Hughson. Internal and physiological responses during concentric and eccentric cycle ergometry. *Eur. J. Appl. Physiol*, 55:291–301, 1986.

M. Gagnon and G. Smith. Muscular mechanical energy expenditure as a process for detecting potential risks in manual materials handling. *J. Biomech.*, 24(3/4):191–203, November 1991

The metabolic cost (MC) of performing a task should take into account the efficiencies associated with positive and negative work, $$MC = \frac{W^+}{n^+} + \frac{W^-}{n^-} \tag{11}$$

where $W^+$ represents concentric work (the work done when the muscles shorten) and $W^-$ represents eccentric work (the work done when the muscles lengthen). The constants $n+$ and $n^-$ are the efficiencies associated with concentric and eccentric action, respectively. At the muscle level, the total metabolic cost of synergistic action of m muscles is obtained by integrating the instantaneous total power and considering the higher metabolic efficiency of eccentric action.

$$MC = \int_{t_0}^{t_f} \left\{ \sum_{i=1}^{m} \left| \frac{P_{m_i}^+}{n^+} \right| + \left| \frac{P_{m_i}^-}{n^-} \right| \right\} dt \tag{12}$$

The computation of mechanical work or metabolic work is unable to resolve the metabolic cost of isometric muscle action. In an unassisted human motion involving isometric work against gravity, mechanically there is no movement; thus no mechanical work is done. However, metabolically there is a cost. The work requirement to hold body segments against gravity cannot therefore be determined with the muscle power or joint power computations. Such work is not negligible in many pathologies and in work-related lifting or carrying tasks where loads are held momentarily against gravity or are carried with a forward body lean for extended periods. This fact leads to an interesting and practical advantage of gravity compensation control. That is, gravity compensation intrinsically removes the metabolic costs associated with isometric contractions against gravity.

Feasibility of Assist Torque

One criterion for determining the feasibility of an assist control algorithm is to consider the effect of an assist control on metabolic cost. We consider the instantaneous assist torque to be metabolically feasible if the metabolic cost of the assisted control is less than the metabolic cost of unassisted control, $$\frac{|P_m|}{n_m} < \frac{|P_n|}{n_n} \quad (13)$$

where $n_m$ and $n_n$ represent the instantaneous metabolic efficiency, depending on if the instantaneous power is positive or negative.

In order to simplify our analysis by considering only the mechanical cost of motion, suppose $n_m = n_n = 1$. Then Equation 13 simplifies to, $$|\tau_m| < |\tau_n| \quad (14)$$

In terms of mechanical energy, the above assumption implies that the design of assist control should be such that the magnitude of the assisted muscle torques does not exceed the magnitude of the unassisted muscle torque. We can express the inequality constraint in terms of the assist torque $\tau_a$ as follows. From Equation 3, the following relation holds, $$|\tau_m| = |\tau_n - \tau_a| \quad (15)$$

Substituting Equation 15 into Equation 14, $$|\tau_n - \tau_a| < |\tau_n| \quad (16)$$

It follows that a necessary and sufficient condition to satisfy Equation 16 is to apply an assist torque that satisfies the following inequality constraint.

$$0 < \tau_a < 2\tau_n \tau_n > 0$$

$$2\tau_n < \tau_a < 0 \tau_n < 0 \quad (17)$$

The feasibility region according to the criteria in Equation 17 is plotted in FIG. 1. In order to develop an intelligent gravity assist controller, we must consider the mechanical energies and the associated feasibility region. For making a general control strategy, it is imperative to develop hybrid controller that will complement the gravity compensation controller presented here, leading to a control strategy that will utilize the natural dynamics of the system when gravity helps motion, as well as compensate for gravity when the gravitational forces are hindering motion.

Method and System of the Present Invention

Based on the aforementioned description, the present invention will be described below.

A method for obtaining an assist torque to be applied to a human joint, in a human assist system in order to reduce the load on muscles, according to the present invention comprises the step of obtaining a moment due to gravity, acting on a joint of each human segment, based on equations of force and moment balance on each segment. The method further comprises the step of obtaining an assist torque to be applied to the joint to compensate for the moment due to gravity, acting on the joint.

A human assist system for applying an assist torque to a human joint to reduce load of muscles, according to the present invention comprises a motor for applying an assist torque to a joint and a motor driver for driving control of the motor. The system further comprises a controller for determining a desired value of an assist torque, comprising a processor and a memory. The controller is configured to obtain a moment due to gravity, acting on a joint of each human segment, based on equations of force and moment balance on each segment and then to obtain an assist torque to be applied to the joint to compensate for the moment due to gravity, acting on the joint.

Thus, according to the present invention, there is a natural subdivision between the voluntary actuators which are responsible for forward progression of motion and the assist actuators which are responsible for preserving static equilibrium. This subdivision may mitigate the interference between voluntary control and artificial control.

According to an embodiment of the present invention, a moment due to gravity, acting on the joint is obtained based on a ground reaction force acting on the foot, the center of pressure of the foot, and an inclining angle of each segment in the step of obtaining a moment due to gravity, acting on the joint.

Thus, a moment due to gravity, acting on the joint can be easily obtained without using a complicated method.

According to another embodiment of the present invention, terms of accelerations except those of the acceleration of gravity, terms of angular acceleration and terms of horizontal forces are set to zero in the equations of force and moment balance on each segment, to obtain a moment due to gravity, acting on the joint.

Thus, a moment due to gravity, acting on the joint can be obtained with reliability and without measuring or calculating terms of center of mass accelerations, terms of angular acceleration and terms of horizontal forces.

According to another embodiment of the present invention, the applied torque at any given joint is estimated by calculating the net torque due to gravitation acceleration.

Thus, the applied torque at any given joint can be easily estimated.

According to another embodiment of the present invention, a ground reaction force is obtained based on measurement from a sensor. Accordingly, a ground reaction force can be obtained with reliability.

According to another embodiment of the present invention, a ground reaction force is obtained based on predetermined constants. Accordingly, a ground reaction force can be easily obtained without fail.

According to another embodiment of the present invention, the center of pressure under the foot is obtained based on measurements from a sensor. Accordingly, the center of pressure under the foot can be obtained with reliability.

According to another embodiment of the present invention, an assist torque is obtained in real time through real time processing. Accordingly, the method and system are appropriate to real-time human assist control.

According to another embodiment of the present invention, segments include, a foot, a shin and a thigh. Accordingly, an assist torque to be applied to any of an ankle joint, knee joint and a hip joint can be obtained.

According to another embodiment of the present invention, an inclining angle of each segment is obtained based on a measurement from a sensor. Accordingly, an inclining angle of each segment can be obtained with reliability.

According to another embodiment of the present invention, the sensor is a joint angle sensor which indicates a joint bending angle.

According to another embodiment of the present invention, the joint angle sensor is a potentiometer.

Thus, an inclining angle of each segment can be obtained with reliability and without a need for a sophisticated sensor.

According to another embodiment of the present invention, the method is used during a period of human operations of lifting and lowering a load. Accordingly, the human assist control can be carried out with reliability during a period of human operations of lifting and lowering a load.

According to another embodiment of the present invention, the system is of exoskeleton type. Accordingly, control of the human assist system of exoskeleton type can be carried out with reliability.

DETAILED DESCRIPTION OF THE PREFERRED EMBODIMENTS

Iterative "Ground Up" Gravity Compensation

Figure 1:
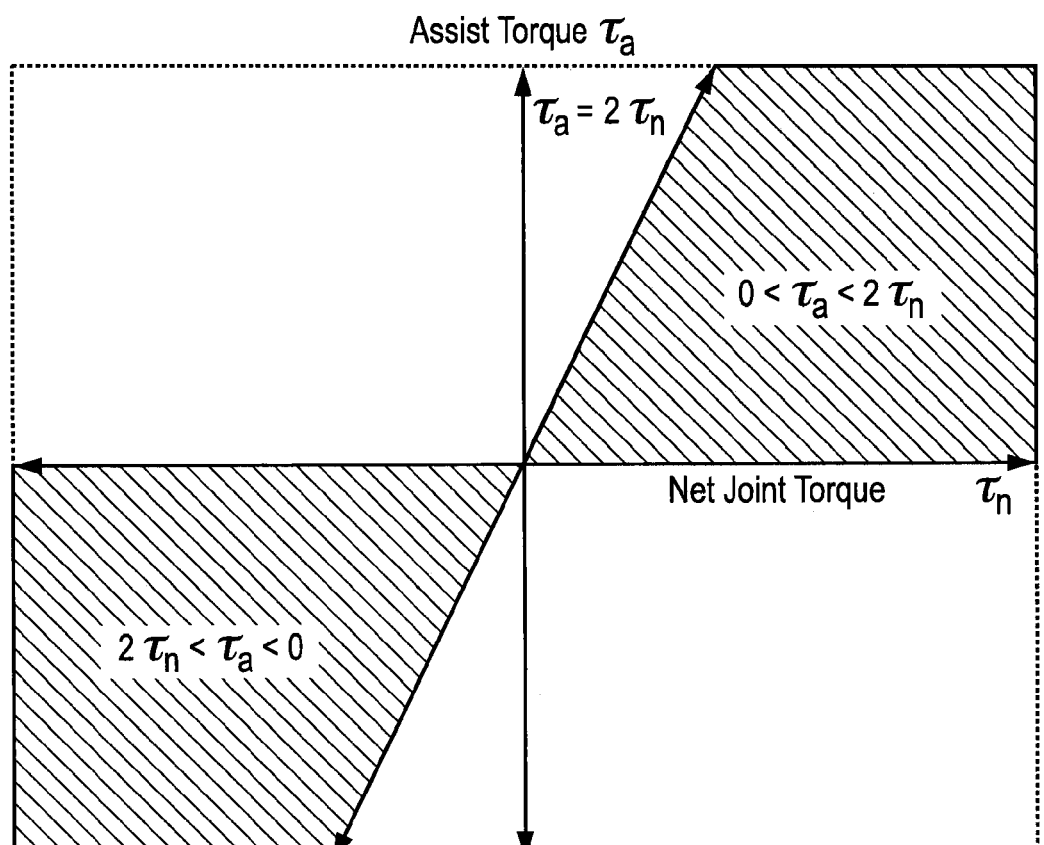
FIG. 1 shows the region where feasible assist is given.
Figure 2:
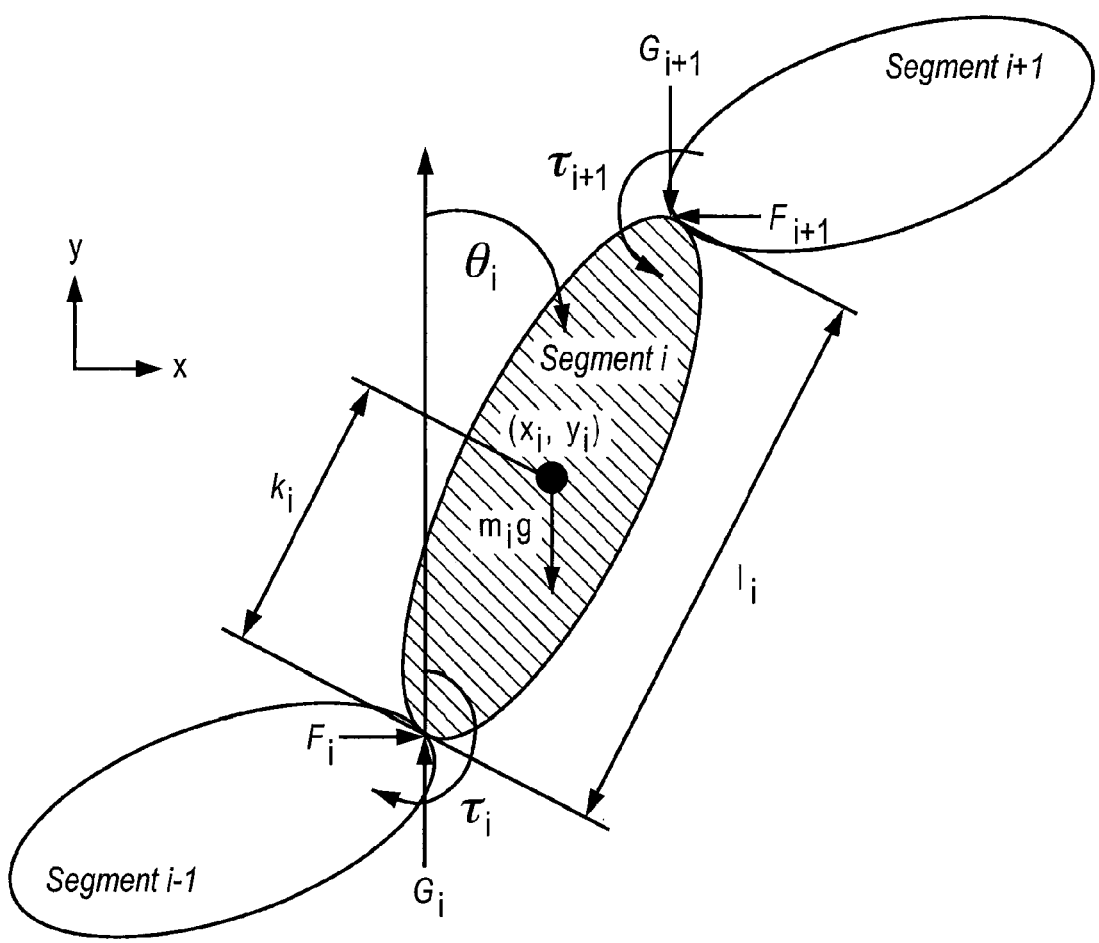
FIG. 2 shows isolated rigid body.

Here, we present the gravity compensation algorithm in a recursive formulation. This formulation is more suited for realization of exoskeleton control schemes that are more robust to parametric uncertainties and unmodelled dynamics. The algorithm uses the vertical ground reaction force as a constraint, and iteratively computes the moments at the joints due to gravity. Consider a multi-body planar dynamical system. For an isolated body segment i (i=1 . . . n) as shown in FIG. 2, let $(\ddot{x}_i, \ddot{y}_i), \theta_i, \ddot{\theta}_i$ be respectively the accelerations of the center of mass, joint angle with respect to the vertical, and angular acceleration. The physical parameters, $m_i$, $I_i$, $l_i$, and $k_i$, represent the mass, moment of inertia, segment length, and length to center of mass of link i.

Let $F_i$, $G_i$, and $\tau_i$, represent respectively, the horizontal force, vertical force, and joint moment exerted on segment i by segment i−1. Similarly, let $-F_{i+1}$, $-G_{i+1}$, and $-\tau_{i+1}$ represent respectively, the horizontal force, vertical force, and moment exerted on segment i by segment i+1. The following Newton-Euler equations are derived from analysis of the force and moment balance on each segment.

$$F_{i+1} = F_i - m_i \ddot{x}_i \tag{18}$$

$$G_{i+1} = G_i - m_i g - m_i \ddot{y}_i \tag{19}$$

$$\tau_{i+1} = \tau_i - F_i k_i \cos(\theta_i) + G_i k_i \sin(\theta_i) - F_{i+1}(l_i - k_i)\cos(\theta_i) + G_{i+1}(l_i - k_i)\sin(\theta_i) - I_i \ddot{\theta}_i \tag{20}$$

Consider link one to be the foot and let $F_1$, $G_1$, be the ground reaction force acting at the center of pressure. The reaction moment at center of pressure is considered to be zero, i.e., $\tau_1 = 0$. The length $l_i$ originates at the center of pressure and terminates at the ankle joint, and the length $k_i$ originates at the center of pressure and terminates at the center of mass of the foot. The coordinates of the center of mass of each segment are calculated using kinematic equations. Using the above Newton Euler equations, the "ground up" inverse dynamics procedure utilizes the kinematics as well as the ground reaction forces to recursively estimate the net joint force and net joint moment at successive joints. Equation 20 represents the net joint torque $\tau_{n_i}$ at joint i. In theory, the vector of joint torques $\tau_{n_i} \forall i \in [1 \ldots n]$ is identical to the net joint torque obtained using Equation 3. The distinction is that this procedure is iterative and requires the ground reaction force as a constraint. The integration of ground reaction forces and kinematic data in an iterative procedure is advantageous because the formulation does not require modeling the entire body: it is therefore the preferred method for estimating joint moments and joint forces at the ankle, knee, and hips.

With the proper constraints, the "ground up" inverse dynamics equations may be used to develop a "ground up" gravity compensation algorithm. From Equations 18–20, it follows that the contribution of gravity and vertical static loads on the joint moments can be observed by setting all accelerations, and all horizontal joint reaction forces to zero. That is, $$\ddot{x}_i = \ddot{y}_i = \ddot{\theta}_i = F_i = 0 \tag{21}$$

Using the above constraints in Equations 18–20, we obtain the iterative formulation to compute the force and moment at each joint due to the effect of gravity (denoted by the subscript g).

$$F_{g(i+1)} = 0 \quad (22)$$

$$G_{g(i+1)} = G_{g(i)} - m_i g$$

$$\tau_{g(i+1)} = +\tau_{g(i)} + G_{g(i)} k_i \sin(\theta_i) + G_{g(i+1)} (l_i - k_i) \sin(\theta_i) \quad (23)$$

Since the above equations relate the effect of vertical static loads to the net moment, the constraints for the ground reaction must appropriately be selected as $$F_{g(1)} = 0 \quad (24)$$

$$\tau_{g(1)} = 0 \quad (25)$$

$$G_{g(1)} = \sum_{i=1}^{n} m_i g + G_e \quad (26)$$

where $G_e$ is the net vertical static force due to external loads and $$\sum_{i=1}^{n} m_i g$$

is the gravitational force due to total body mass.

Suppose joints i(i=1 . . . n) are all actuated. The gravity compensation control law used to generate the desired assist control at each joint is, $$\tau_{a(1)} = 0 \quad (27)$$

$$\tau_{a(i+1)} = \tau_{g(i+1)} \quad (28)$$

The desired assist torque at all the joint is simply the vector generated by $$\tau_{a(desire)} = [\tau_a(1), \tau_a(2), \ldots \tau_a(n)] \quad (29)$$

If a joint is not actuated, then the assist torque at that joint is simply zero.

Entire System

Figure 3:
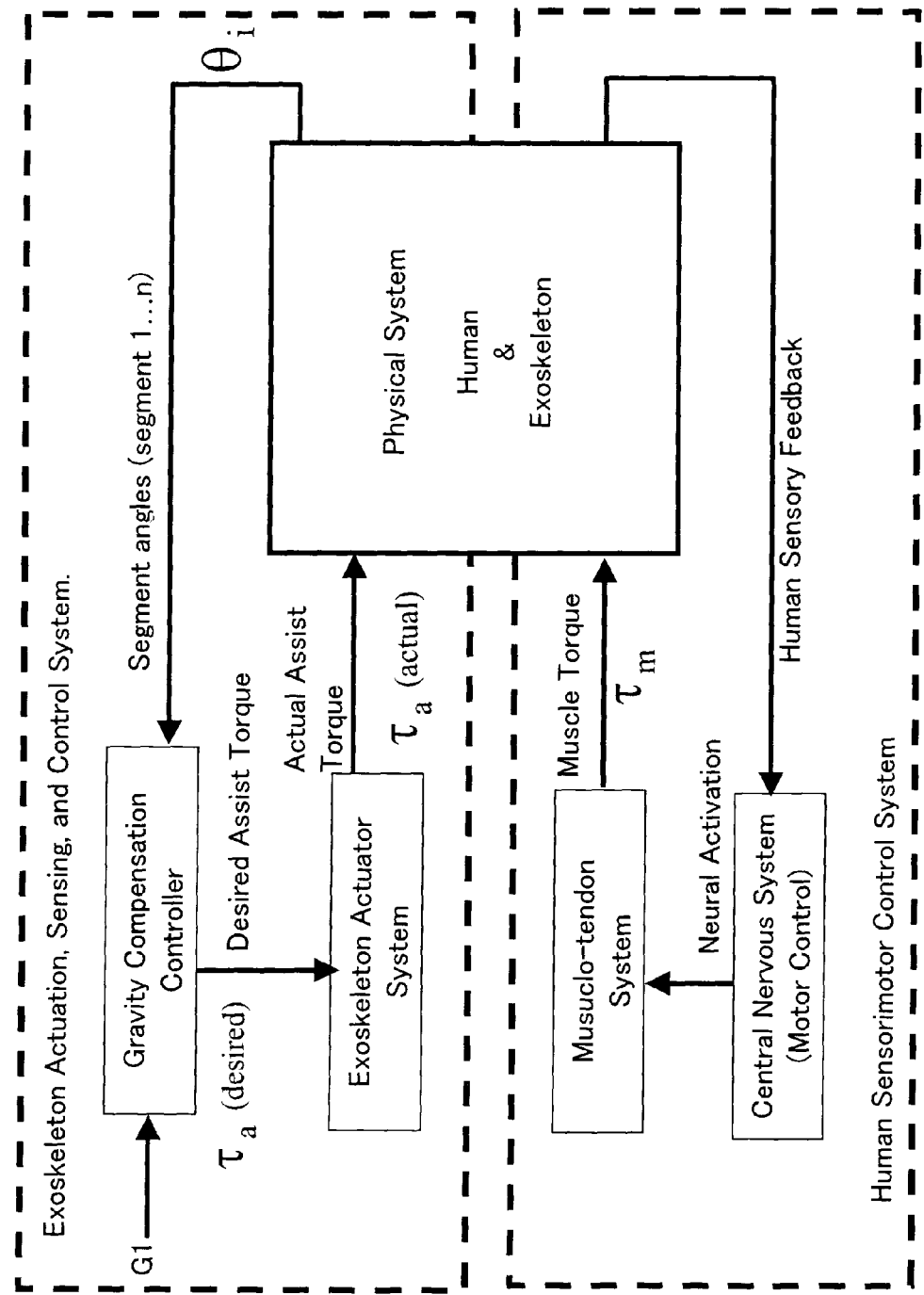
FIG. 3 is a block-diagram of the interaction of the human sensory motor control system and the exoskeleton actuation, sensing, and control system in order to control the human body equipped with an exoskeleton.

The block-diagram of the entire system including a gravity compensation controller, an exoskeleton actuator system and a human and an exoskeleton is shown in FIG. 3. The exoskeleton actuator/control system takes the desired assist torque that is calculated using the above controller and attempts to generate the desired torque at its output. The actual assist torque that is used to drive the human joints is the output of the actuator system. The gravity compensation controller and the exoskeleton actuator system constitute a human assist system.

Human Assist System

Figure 5:
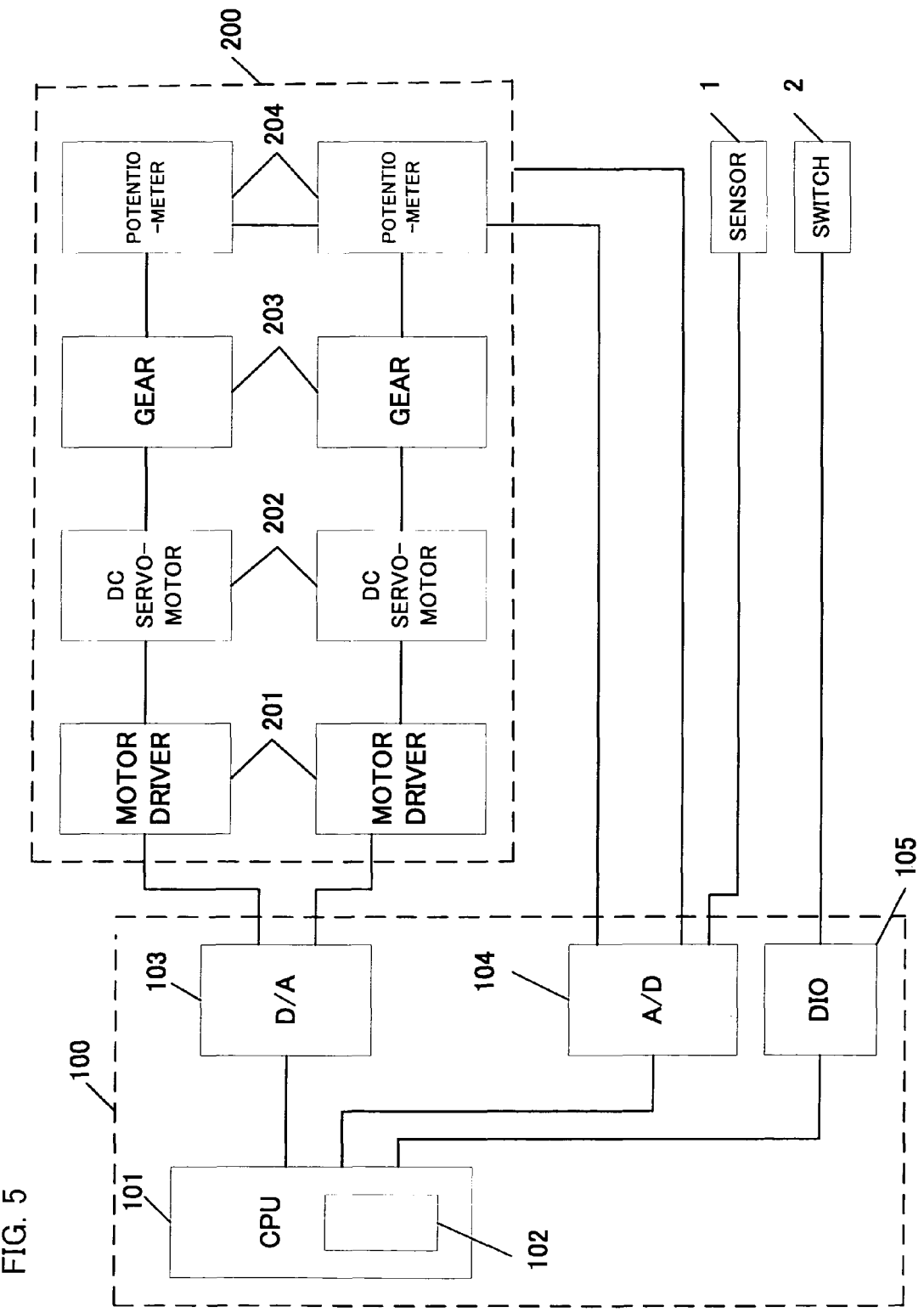
FIG. 5 is a block-diagram of the human assist system.

The block-diagram of the human assist system is shown in FIG. 5. As mentioned above, the human assist system comprises the gravity compensation controller 100 and the exoskeleton actuator system 200. The gravity compensation controller 100 has a CPU 101, a memory 102, a D/A converter 103, an A/D converter 104 and a digital input/output unit 105. The exoskeleton actuator system 200 has an actuator unit for applying a desired assist torque to each of the joints. The joints include both ankle joints, both knee joints and both hip joints. A plurality of actuator units are provided for these joints. Each actuator unit includes a motor driver 201, DC servomotor 202, a gear 203 and a potentiometer 204.

When a start/stop switch 2 is set to ON state (that is, a start switch is tuned on), the gravity compensation controller 100 starts its operation. When the start/stop switch 2 is set to OFF state (that is, a stop switch is tuned on), the gravity compensation controller 100 stops its operation. While the start/stop switch 2 is set to "ON" state, the gravity compensation controller 100 iteratively calculates a desired assist torque for each joint at certain intervals, based on Equations 22 to 29. In Equation 26, $G_{g(1)}$ may be obtained through measurement with a ground reaction force sensor 1. The ground reaction force sensor 1 may be a load-cell type one set either on the bottom side of a foot or on the floor. Alternatively, $G_{g(i)}$ may be obtained using data stored in the memory 102. The center of pressure under each foot may be calculated or measured using in-shoe pressure sensor. The body segment parameters, such as mass of each segment, location of the center of mass of each segment, and lengths of each segment may be obtained using regression equations as reported in, Winter D. A (1990), Biomechanic and Motor Control of Human Movement, $2^{nd}$ Edition, Jhon Wiley & Sons, Inc.

The mass of an external load, lifted or carried, by the person may be known from prior measurement. The mass may be assumed to be equally shared by the right side segments and the left side segments. In Equation 23, a joint angle with respect to the vertical (joint inclining angle) $\theta_i$ may be obtained based on an output of the potentiometer 204 at each joint. The output of the potentiometer 204 represents a bending angle at the joint (joint bending angle). A joint angle with respect to the vertical $\theta_i$ can be calculated from a bending angle at each joint.

Then the gravity compensation controller 100 delivers a desired value of assist torque for each joint, to each motor driver 201 of each actuator unit through D/A converter 103. In each actuator unit, the motor driver 201 drives the DC servomotor 202 to deliver the desired assist torque to each joint.

Operational Process

Figure 6:
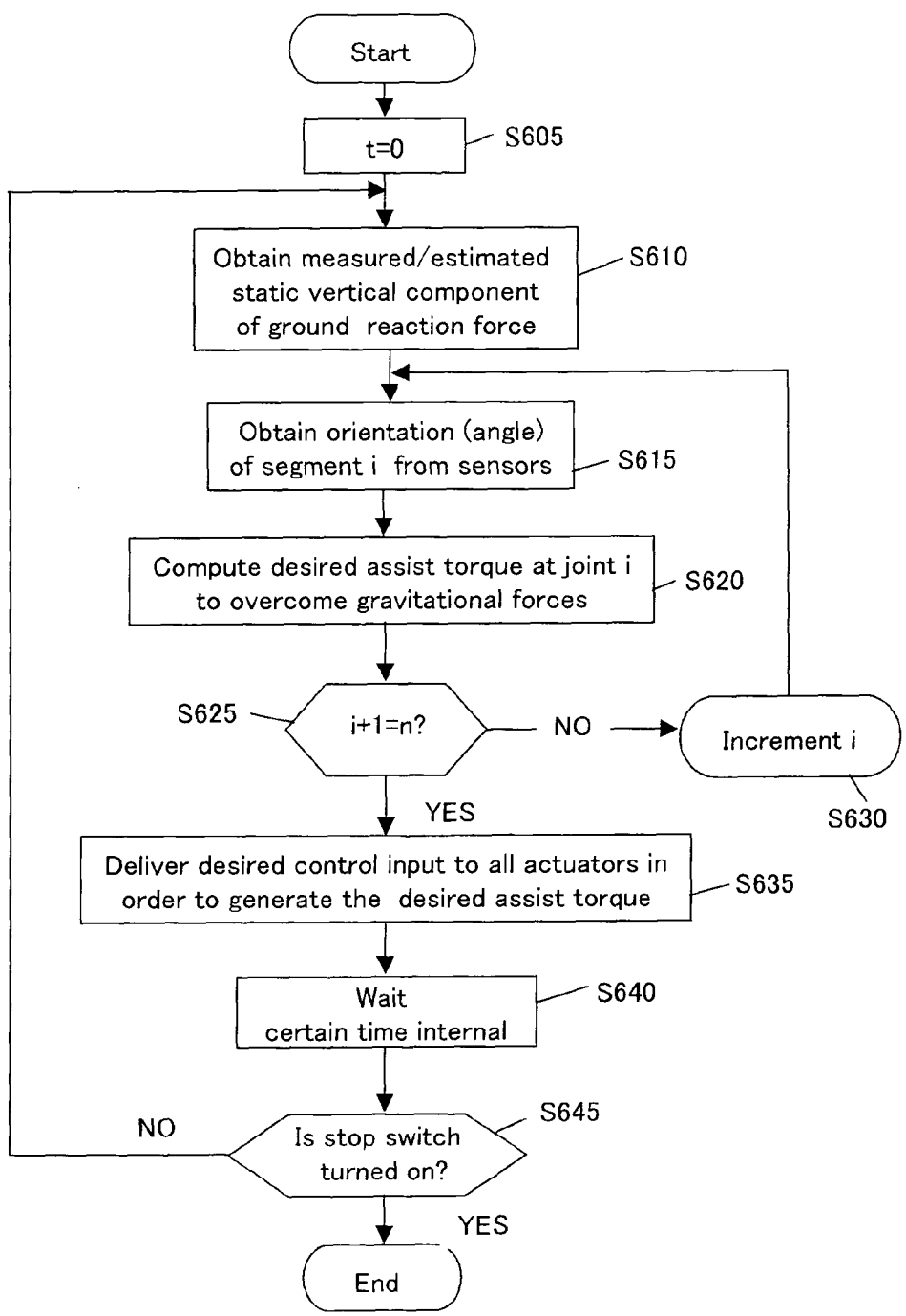
FIG. 6 is a flowchart showing operations of the human assist system.

FIG. 6 is a flowchart of operational process of the human assist system.

At step S605, time is set to zero when the start switch 2 is turned on. At step S610, the static vertical component of ground reaction force is obtained through measurement or estimation.

At step 615, a joint angle with respect to the vertical $\theta_i$ (orientation of segment i) is obtained through a sensor, which may be the potentiometer at each joint. At step 620, a desired assist torque at joint i to overcome gravitational forces, is calculated based on Equations 22 to 29.

At step 625, it is determined whether or not calculations have been carried out for all segments. If the calculations have not been carried out for any of the segments, a counter for i is incremented by 1 at step S630 and then the process returns to step S615. Otherwise, the process proceeds with step S635.

At step S635, a desired assist torque is delivered to each actuator unit through D/A converter in order to generate the desired assist torque. At step S640, the process waits a certain time interval.

At step S645, it is determined whether or not the stop switch 2 is turned on. If the result of the determination is affirmative, the process ends. If the result of the determination is negative, the process returns to step S610.

Simulations

Figure 4:
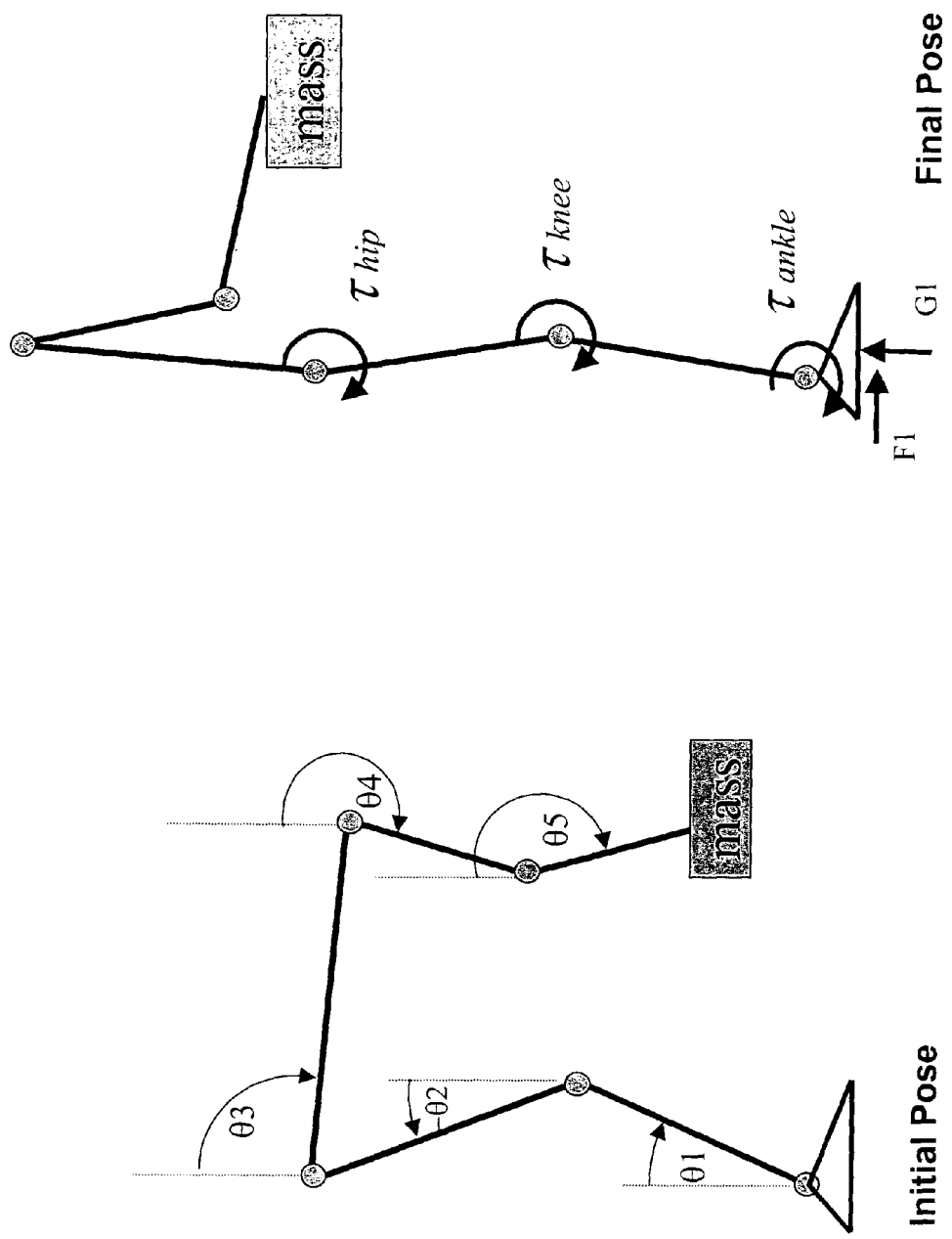
FIG. 4 is a six-segment planar biped showing the initial and final position of the lifting cycle of the motion.

The gravity compensation protocols are simulated for a lifting/lowering motion of a mass representing a manual material handling task. A six-link planar system modeling the foot, lower leg, upper leg, torso, upper arm, and lower arm is used to conduct the analysis, as shown in FIG. 4. The effect of dynamic factors and external mass on the various kinetic and kinematic parameters of the lift have been studied extensively by biomechanists. References should be made to the following documents.

D. Gagnon and M. Gagnon. The influence of dynamic factors on triaxial net muscular moments at the 15/s1 joint during asymmetrical lifting and lowering. *Journal of Biomechanics*, 25:891–901, 1992.

S. H. Hsiang and R. W. McGorry. Three different lifting strategies for controlling the motion patterns of the external load. *Ergonomics*, 40:928–939, 1997.

Such studies have been performed to reduce the risk factor through identification of ergonomic intervention.

Figure 7:
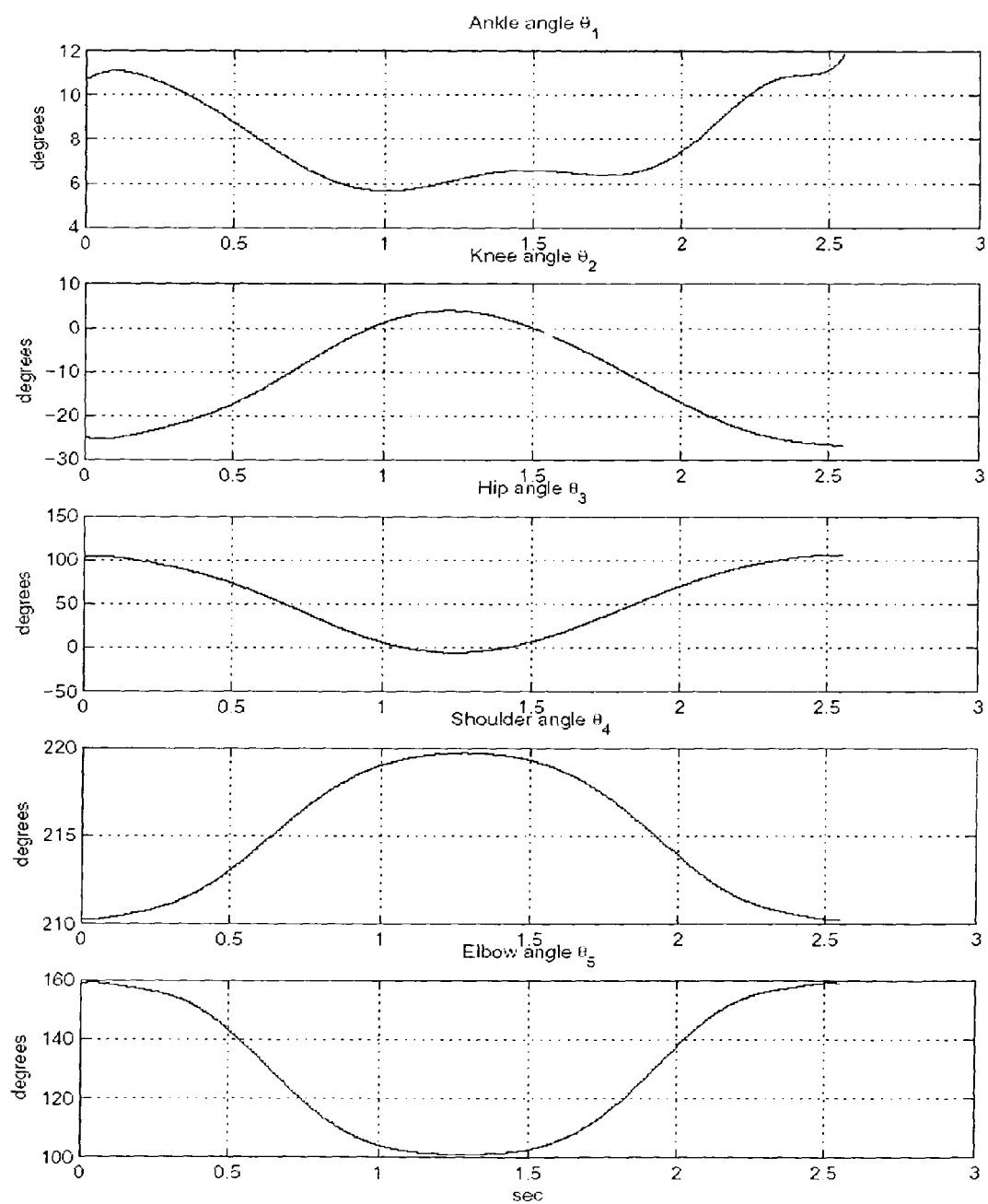
FIG. 7 shows a motion trajectories at the five joints for a lifting and lowering motion of a 10 kg mass.
Figure 8:
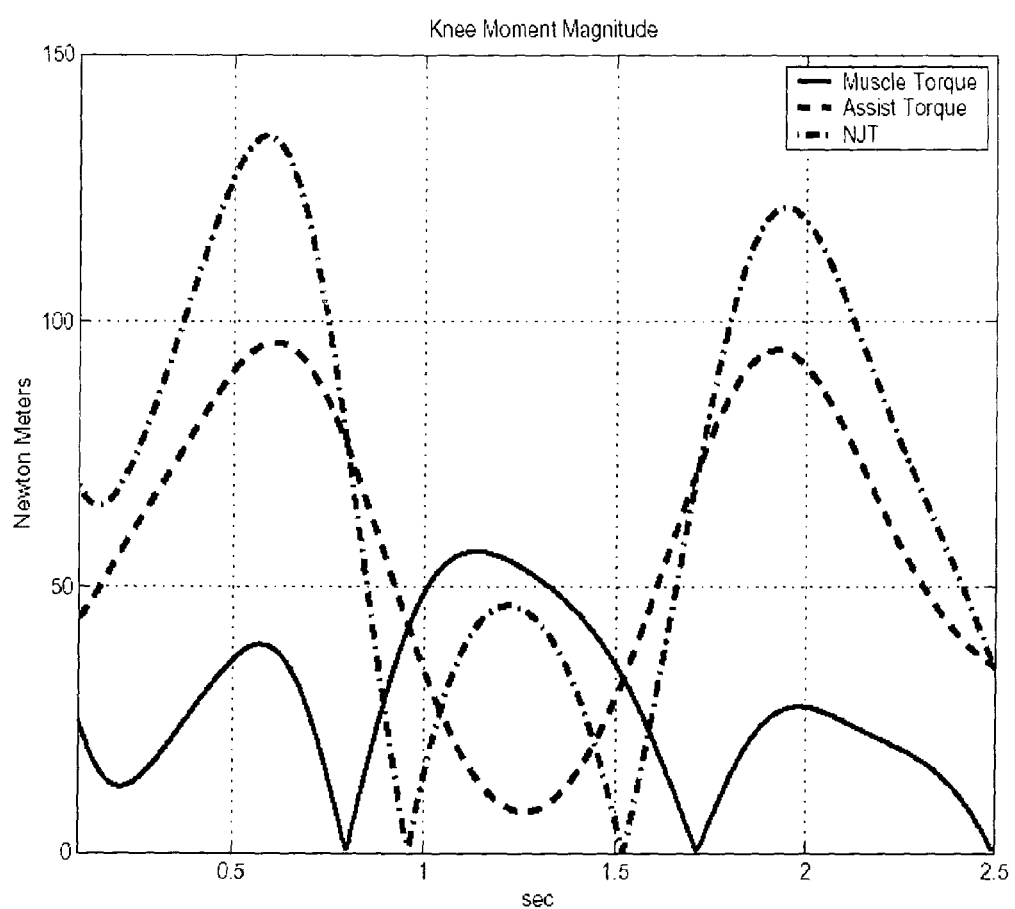
FIG. 8 shows simulated comparison of the magnitude of the assist torque, muscle torque, and net joint torque at the knee.

FIG. 7 shows a motion trajectories at the five joints for a lifting and lowering motion of a 10 kg mass. FIG. 8 shows simulated comparison of the magnitude of the assist torque, muscle torque, and net joint torque at the knee. In the region where the muscle torque at the knee exceeds the net joint torque at the knee, gravity compensation control increases the mechanical power required by the muscles to perform the task. Our analysis cannot predict whether metabolic power is increased or decreased at each time instant. More sophisticated tools are required to fully understand the effect of gravity compensation on the metabolic cost. Moreover, gravity compensation may in fact improve stability at the expense of increased mechanical work.

Figure 9:
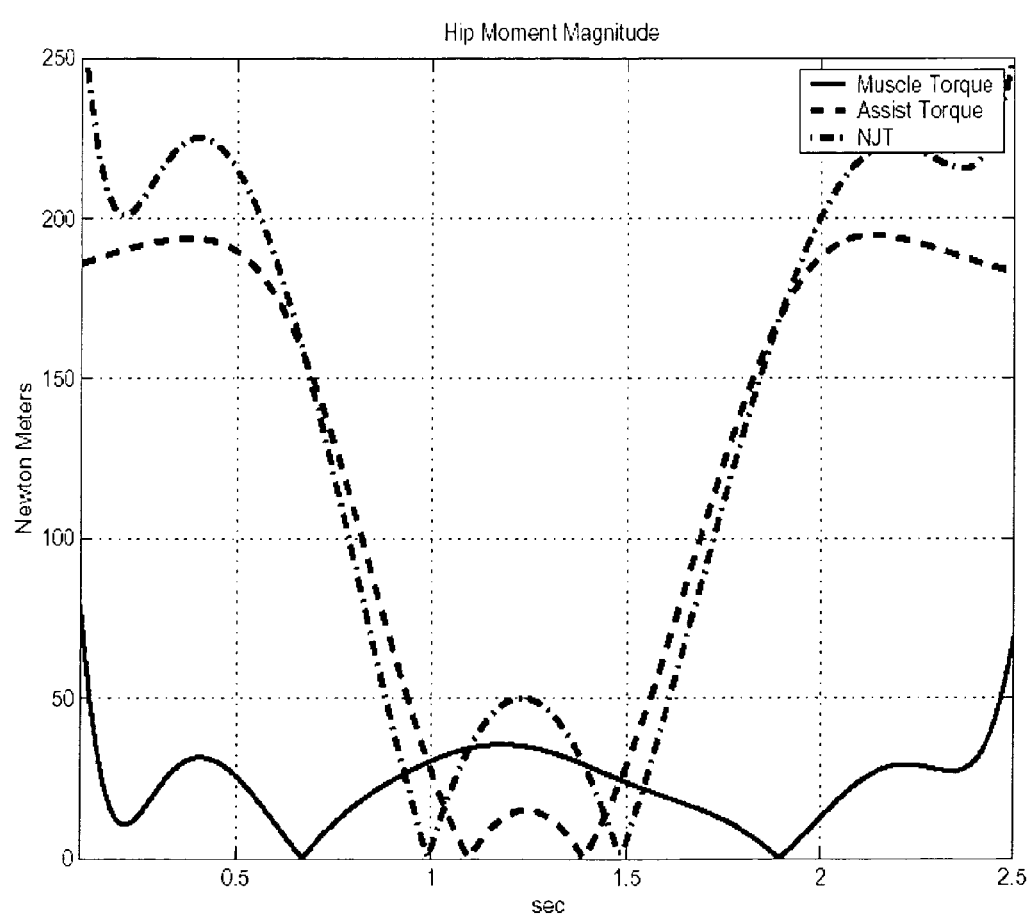
FIG. 9 shows simulated comparison of the magnitude of the assist torque, muscle torque, and net joint torque at the hip.
Figure 10:
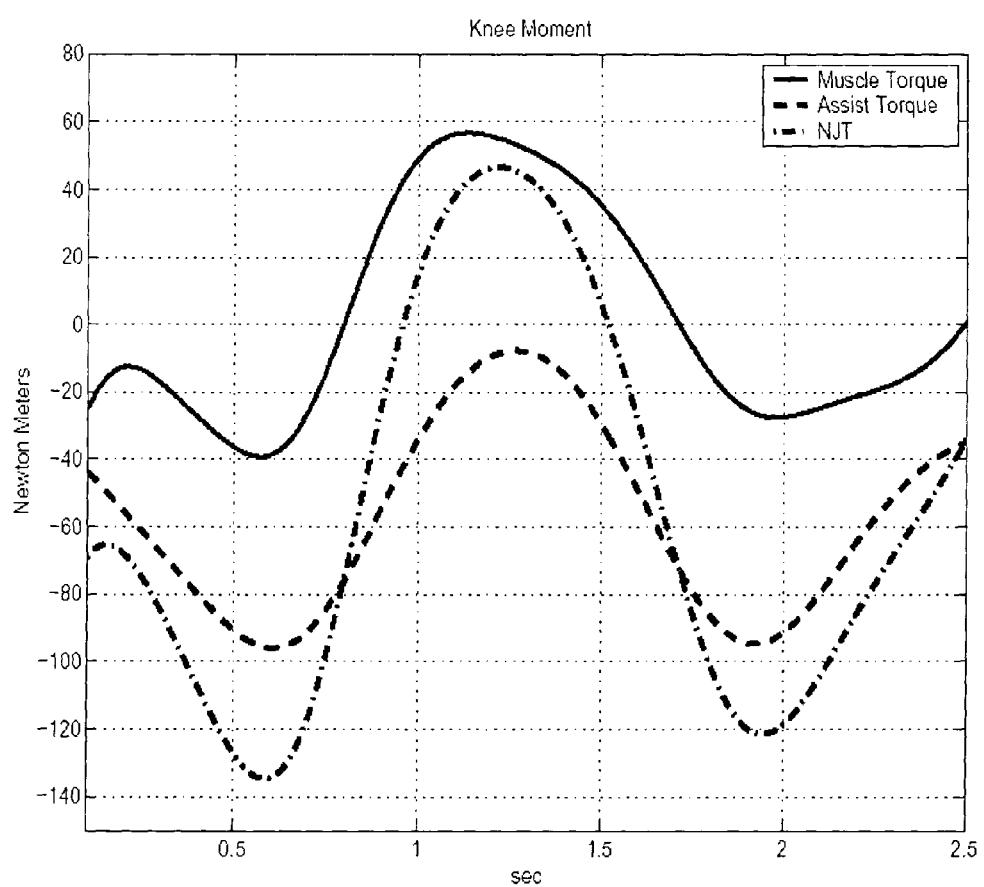
FIG. 10 shows simulated comparison of the assist torque, muscle torque, and net joint torque at the knee.
Figure 11:
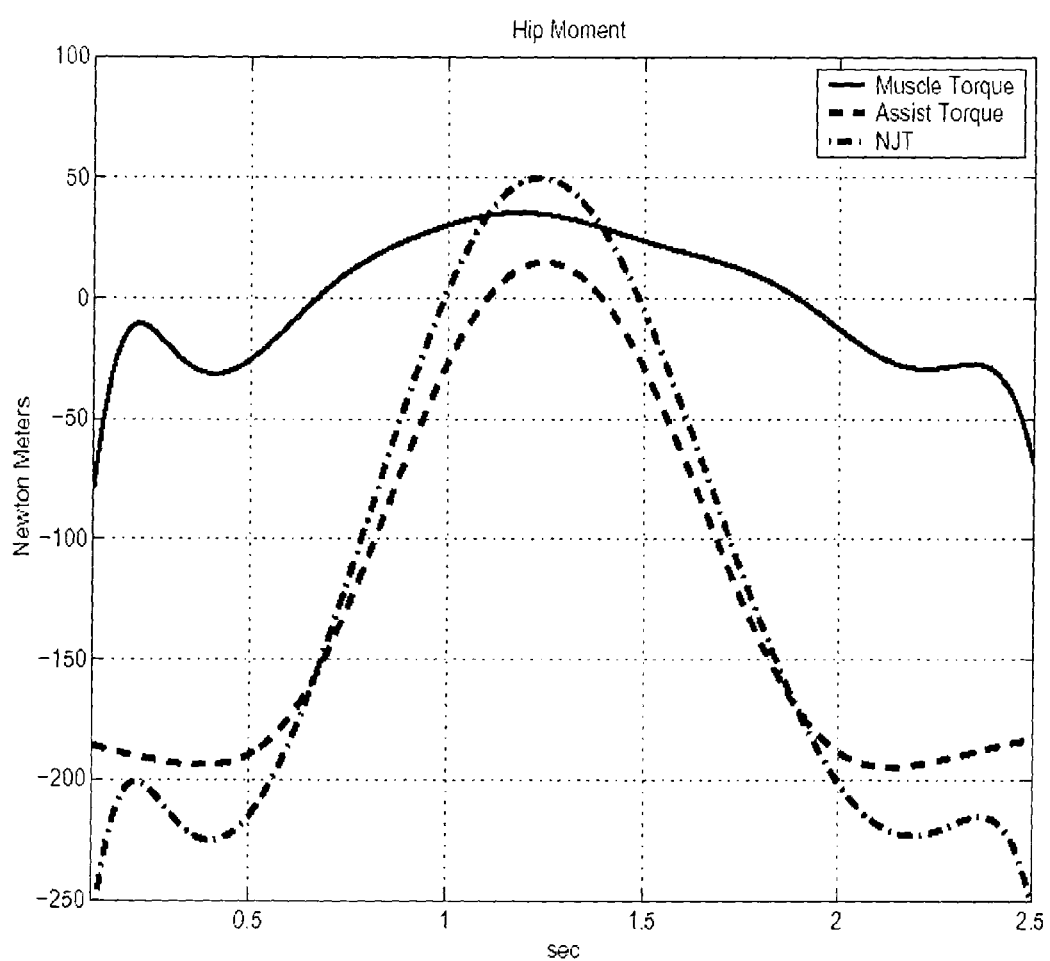
FIG. 11 shows simulated comparison of the assist torque, muscle torque, and net joint torque at the hip.
Figure 12:
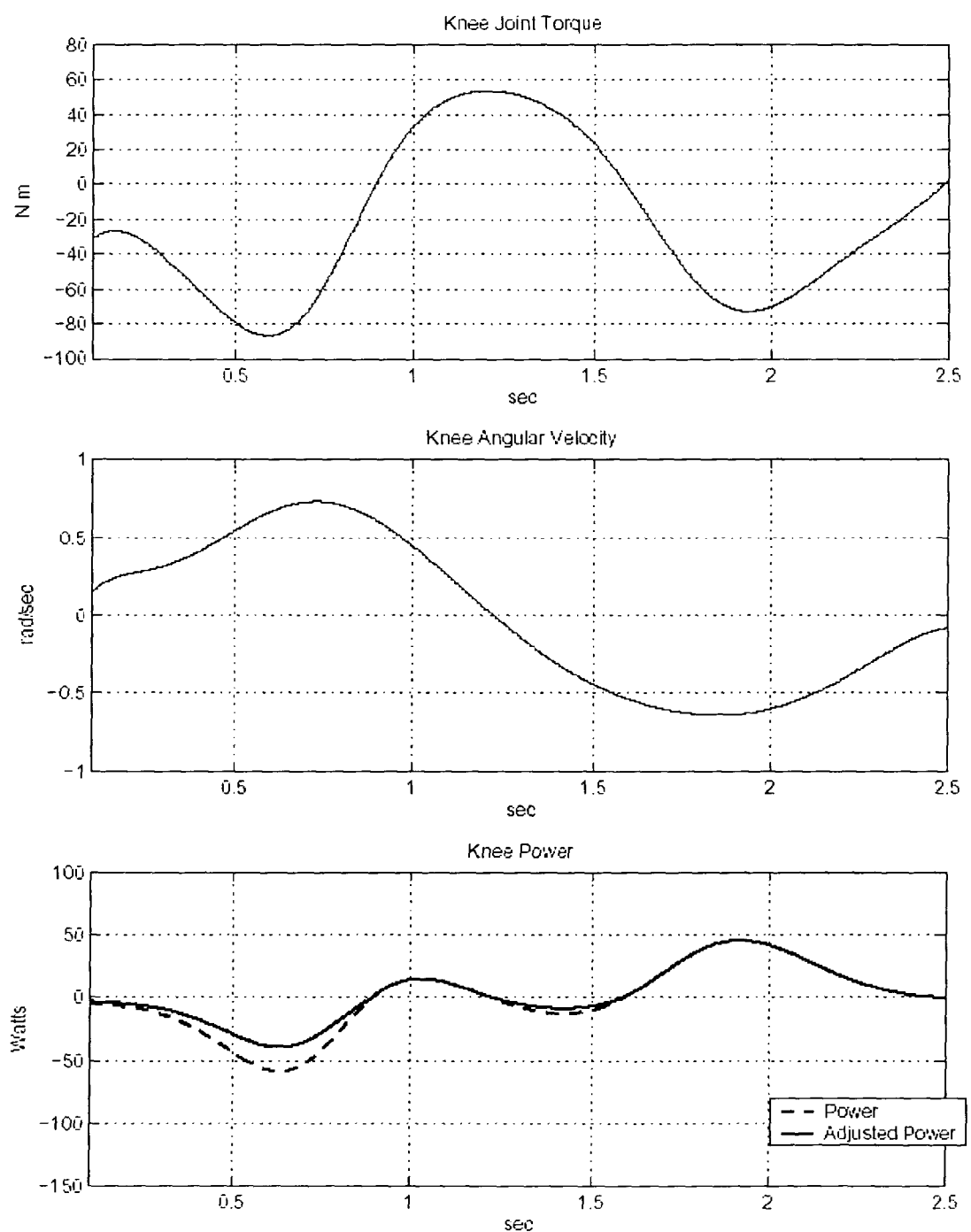
FIG. 12 shows quantities for estimating joint power at the knee, including the joint torque (top), and joint angular velocity (middle).
Figure 13:
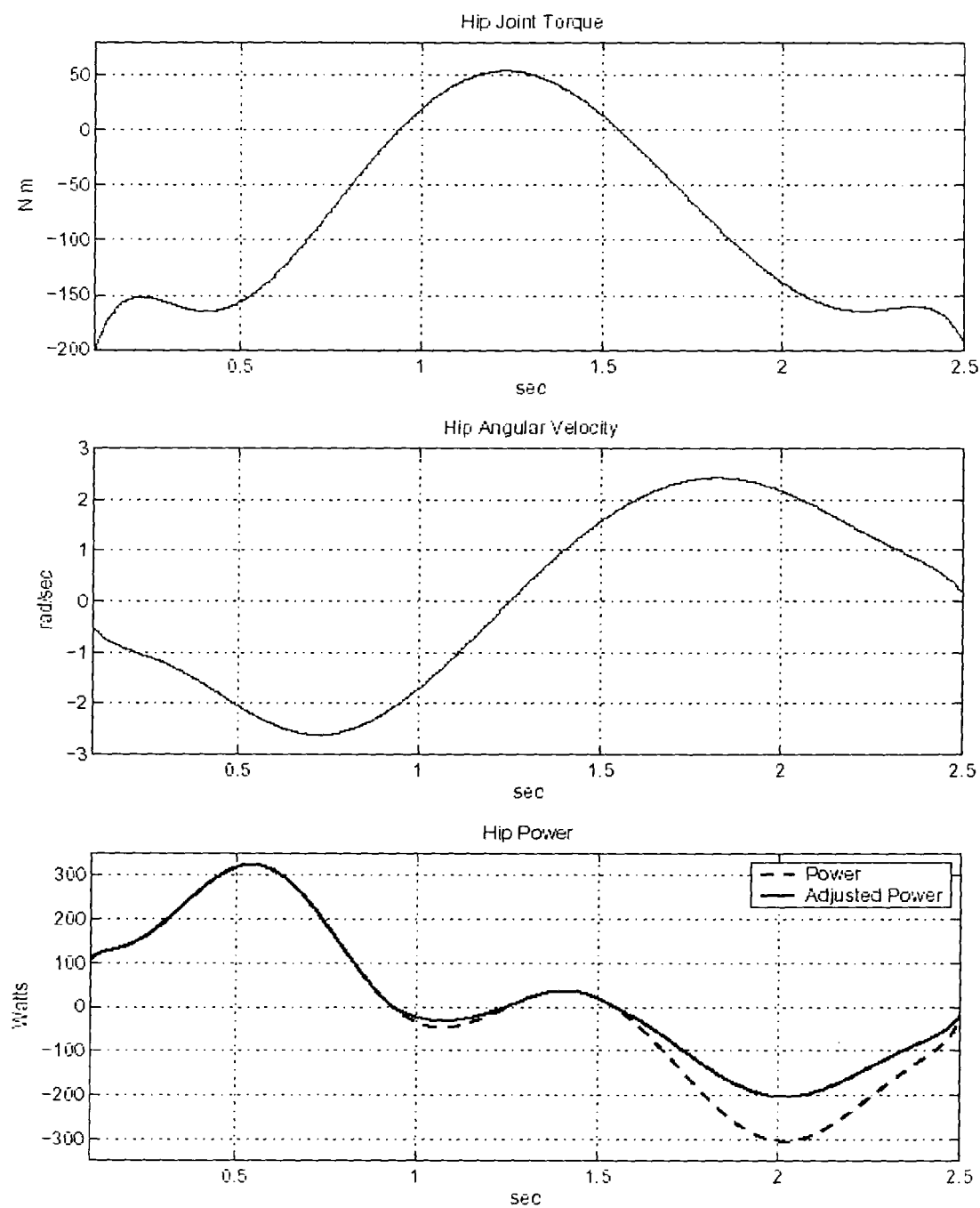
FIG. 13 shows quantities for estimating joint power at the hip, including the joint torque (top), and joint angular velocity (middle).
Figure 14:
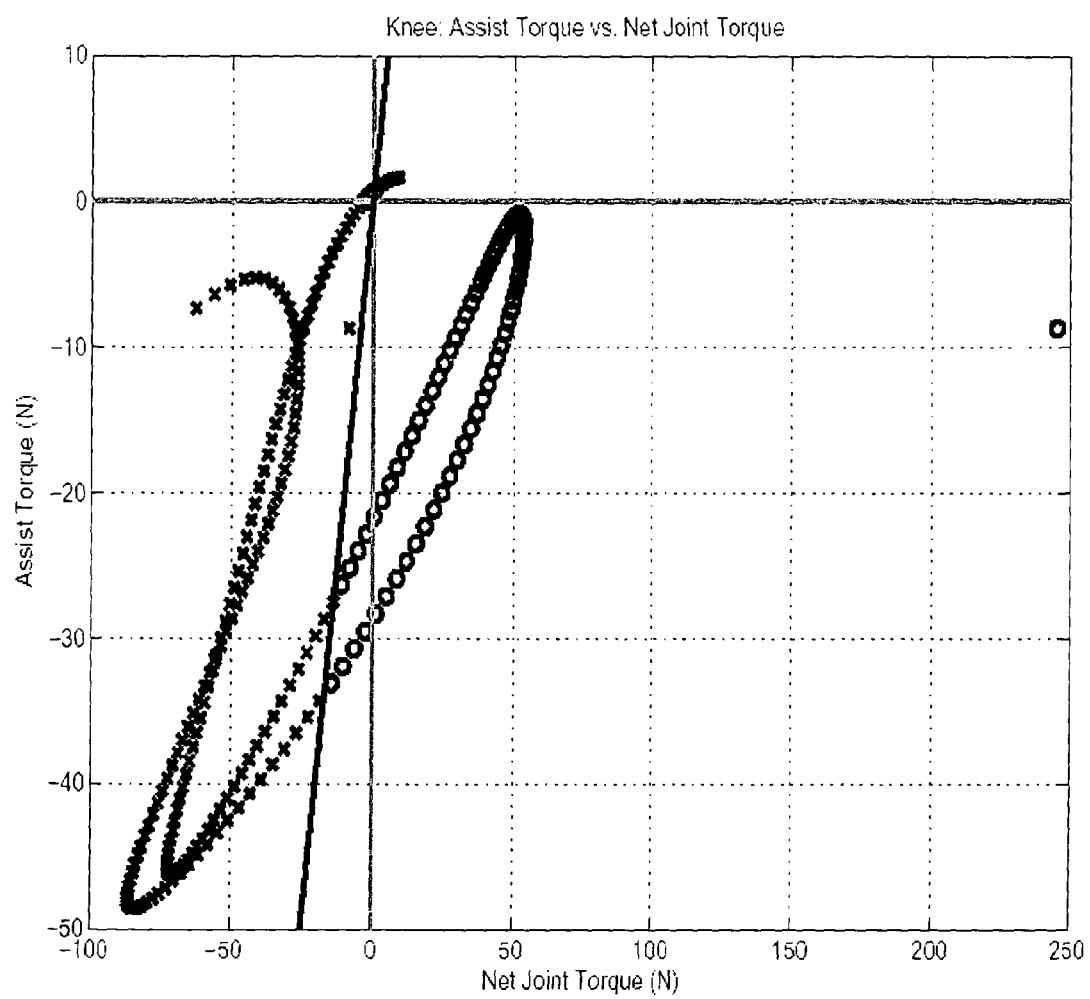
FIG. 14 shows feasibility region of assist torque vs. net joint torque at the knee joint.
Figure 15:
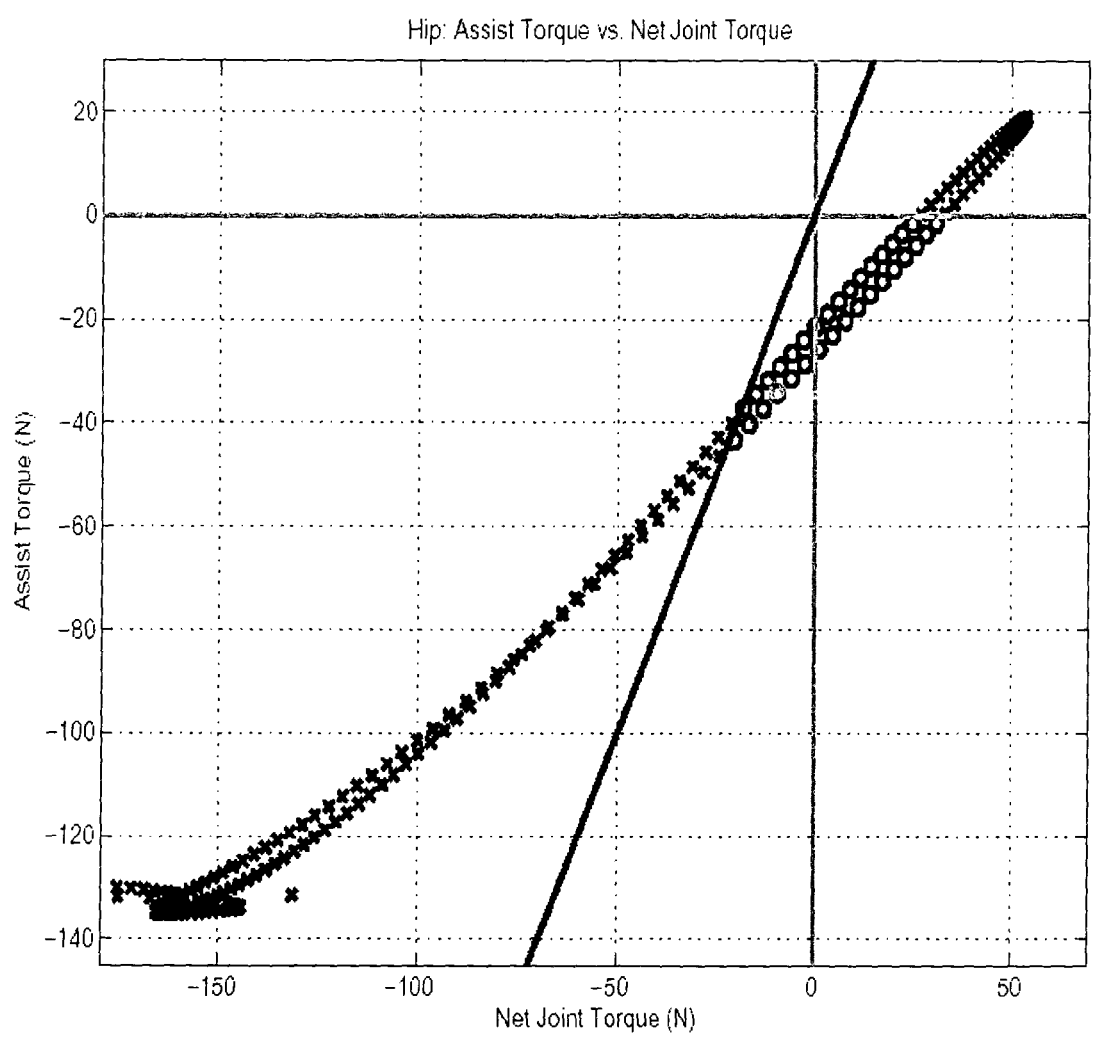
FIG. 15 shows feasibility region of assist torque vs. net joint torque at the hip joint.

FIG. 9 shows simulated comparison of the magnitude of the assist torque, muscle torque, and net joint torque at the hip. Gravity compensation control increases the mechanical power required by the muscle to perform the task in the region where the muscle torque at the hip exceeds the net joint torque at the hip. FIG. 10 shows simulated comparison of the assist torque, muscle torque, and net joint torque at the knee. Gravity compensation decreases the efficiency of motion in the region where the assist torque and net joint torque have opposite signs. FIG. 11 shows simulated comparison of the assist torque, muscle torque, and net joint torque at the hip. Gravity compensation decreases the efficiency of motion in the region where the assist torque and net joint torque have opposite signs. FIG. 12 shows quantities for estimating joint power at the knee, including the joint torque (top), and joint angular velocity (middle). The joint power is plotted in the bottom graph. The adjusted joint power considers the metabolic cost index of positive and negative work. Based on data available from the literature, an index of $n^-=1.5$ and $n^+=1.0$ was used in this simulation. FIG. 13 shows quantities for estimating joint power at the hip, including the joint torque (top), and joint angular velocity (middle). The joint power is plotted in the bottom graph. The adjusted joint power considers the metabolic cost index of positive and negative work. Based on data available from the literature, an index of $n^-=1.5$ and $n^+=1.0$ was used in this simulation. FIG. 14 shows feasibility region of assist torque vs. net joint torque at the knee joint. The feasibility region of gravity assist is denoted by the blue 'x' plot ticks. The region with the 'o' plot ticks produce voluntary muscle torque which are not feasible. FIG. 15 shows feasibility region of assist torque vs. net joint torque at the knee joint. The feasibility region of gravity assist is denoted by the blue 'x' plot ticks. The region with the 'o' plot ticks produce voluntary muscle torque which are not feasible.

FIGS. 8 to 11 show that muscle torques at knee and hip joints are considerably reduced in comparison with net joint torques. This means that the iterative "ground up" gravity compensation has significantly reduced the work required by the muscles to perform this task.

What is claimed is:

1. A method for obtaining an assist torque to be applied to a human joint, in a human assist system for applying an assist torque to the human joint to reduce load of muscles, comprising the steps of:

determining whether the assist torques to be applied to the joint will increase or decrease the muscle mechanical power at the joint at a given instant in time;

obtaining a moment due to gravity, acting on a joint of each human segment, based on equations of force and moment balance on each segment; and obtaining an assist torque to be applied to the joint such that the moment due to gravity, acting on the joint is compensated for.

2. A method according to claim 1, wherein a moment due to gravity, acting on the joint is obtained based on a ground reaction force acting on the foot, the center of pressure under the foot, and an inclining angle of each segment in the step of obtaining a moment due to gravity, acting on the joint.

3. A method according to claim 1, wherein terms of accelerations except those of the acceleration of gravity, terms of angular acceleration and terms of horizontal forces are set to zero in the equations of force and moment balance on each segment, to obtain a moment due to gravity, acting on the joint.

4. A method according to claim 1, wherein the applied torque at any given joint is estimated by calculating the net torque due to gravitation acceleration.

5. A method according to claim 1, wherein a ground reaction force is obtained based on a measurement of a sensor.

6. A method according to claim 1, wherein a ground reaction force is obtained based on predetermined constants.

7. A method according to claim 1, wherein an assist torque is obtained in real time through real time processing.

8. A method according to claim 1, wherein segments include, a foot, a shin and a thigh.

9. A method according to claim 1, wherein an inclining angle of each segment is based on a measurement of a sensor.

10. A method according to claim 9, wherein the sensor is a joint angle sensor which indicates a joint bending angle.

11. A method according to claim 10, wherein the joint angle sensor is a potentiometer.

12. A method according to claim 1, used during a period of human operations of lifting and lowering a load.

13. A human assist system for delivering an assist torque to a human joint to reduce load of muscles, comprising a motor for delivering an assist torque to a joint, a motor driver for driving control of the motor, and a controller for determining a desired value of an assist torque, the controller comprising a processor and a memory and being configured to obtain a moment due to gravity, acting on a joint of each human segment, based on equations of force and moment balance on each segment and then to obtain an assist torque to be applied to the joint such that the moment due to gravity, acting on the joint is compensated for.

14. A human assist system according to claim 13, wherein the system is of exoskeleton type.

15. A human assist system according to claim 13, wherein a moment due to gravity, acting on the joint is obtained by a ground reaction force acting on the foot and an inclining angle of each segment in the step of obtaining a moment due to gravity, acting on the joint.

16. A human assist system according to claim 13, wherein terms of accelerations except those of the acceleration of gravity, terms of angular acceleration and terms of horizontal forces are set to zero in the equations of force and moment balance on each segment, to obtain a moment due to gravity, acting on the joint.

17. A human assist system according to claim 13, wherein the system further comprises a sensor for detecting a ground reaction force and a ground reaction force is obtained based on a measurement of the sensor.

18. A human assist system according to claim 13, wherein the system further comprises a sensor for detecting the center of pressure and the center of pressure is obtained based on a measurement of the sensor.

19. A human assist system according to claim 13, wherein a ground reaction force is obtained based on predetermined constants.

20. A human assist system according to claim 13, wherein an assist torque is obtained in real time through real time processing.

21. A human assist system according to claim 13, wherein the system further comprises a sensor for obtaining an inclining angle of each segment.

22. A human assist system according to claim 21, wherein the sensor is a joint angle sensor which indicates a joint bending angle.

23. A human assist system according to claim 22, wherein the joint angle sensor is a potentiometer.

* * * * *